US007596576B2

(12) United States Patent
Venkatesh et al.

(10) Patent No.: US 7,596,576 B2
(45) Date of Patent: *Sep. 29, 2009

(54) SYSTEM AND METHOD FOR PROVIDING USER DEFINED TYPES IN A DATABASE SYSTEM

(75) Inventors: Ramachandran Venkatesh, Bellevue, WA (US); Jun Fang, Sammamish, WA (US); Jose A. Blakeley, Redmond, WA (US); Beysim Sezgin, Redmond, WA (US); Balaji Rathakrishnan, Sammamish, WA (US); Peter A. Carlin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

This patent is subject to a terminal disclaimer.

(21) Appl. No.: 11/057,475

(22) Filed: Feb. 14, 2005

(65) Prior Publication Data

US 2005/0177585 A1    Aug. 11, 2005

Related U.S. Application Data

(63) Continuation of application No. 10/775,282, filed on Feb. 10, 2004, now Pat. No. 6,976,029.

(51) Int. Cl.
 G06F 7/00   (2006.01)
 G06F 17/00  (2006.01)
(52) U.S. Cl. .......................... 707/102; 707/4; 707/200; 717/106; 717/114

(58) Field of Classification Search ............... 707/1–10, 707/100–104.1, 200–206; 717/106, 114, 717/115, 122, 136, 140, 141, 146, 148, 159
See application file for complete search history.

(56) References Cited

U.S. PATENT DOCUMENTS 5,297,279 A    3/1994  Bannon et al. .............. 395/600

(Continued)

OTHER PUBLICATIONS

Fertalj et al., Source code generator based on a proprietary specification language, Jan. 7-10, 2002, IEEE, 3696-3704.*

(Continued)

Primary Examiner—Jean B Fleurantin
(74) Attorney, Agent, or Firm—Woodcock Washburn LLP

(57) ABSTRACT

A database system and method allows a user to write program code in a high-level programming language that implements a class that defines the structure of a user-defined type and methods that can be invoked on instances of the type. The class is then registered with the database system, which enforces a specific contract for user-defined types against the class. The contract comprises the following requirements. First, the class must specify one of a plurality of different formats for persisting instances of the user-defined type in a database store. Second, the class must be capable of returning a null value for the user-defined type. Third, the class must provide a method for converting the user-defined type to another type. Once these requirements are satisfied, the database system enables instances of the user-defined type to be created. A user-defined type can be used in all contexts where any other built-in type can be used. This includes defining columns of tables, declaring variables and parameters to functions and stored procedures, and evaluating expressions of the user-defined type in SQL queries and updates. Preferably, the database system stores metadata about the user-defined type for subsequent use in creating instances of the type.

19 Claims, 8 Drawing Sheets

U.S. PATENT DOCUMENTS

| | | | | |
|---|---|---|---|---|
| 5,437,027 | A | 7/1995 | Bannon et al. | 395/600 |
| 5,696,961 | A | 12/1997 | Briscoe et al. | 395/602 |
| 5,826,077 | A | 10/1998 | Blakeley et al. | 395/604 |
| 5,864,862 | A | 1/1999 | Kriens et al. | 707/103 |
| 5,884,317 | A | 3/1999 | Cline et al. | 707/103 |
| 5,900,870 | A | 5/1999 | Malone et al. | 715/866 |
| 6,047,291 | A | 4/2000 | Anderson et al. | 707/103 |
| 6,070,174 | A | 5/2000 | Starek et al. | 707/206 |
| 6,108,004 | A | 8/2000 | Medl | 715/804 |
| 6,112,024 | A | 8/2000 | Almond et al. | 717/122 |
| 6,199,100 | B1 | 3/2001 | Filepp et al. | 709/203 |
| 6,199,195 | B1 | 3/2001 | Goodwin et al. | 717/104 |
| 6,223,344 | B1 | 4/2001 | Gerard et al. | 717/170 |
| 6,338,056 | B1 | 1/2002 | Dessloch et al. | 707/2 |
| 6,370,541 | B1 | 4/2002 | Chou et al. | 707/103 |
| 6,505,211 | B1 | 1/2003 | Dessloch et al. | 707/103 Y |
| 6,519,597 | B1 | 2/2003 | Cheng et al. | 707/10 |
| 6,556,983 | B1 | 4/2003 | Altschuler et al. | 706/55 |
| 6,564,205 | B2 | 5/2003 | Iwata et al. | 707/2 |
| 6,578,046 | B2 | 6/2003 | Chang et al. | 707/4 |
| 6,671,687 | B1 | 12/2003 | Pederson et al. | 707/9 |
| 6,697,794 | B1 | 2/2004 | Milby | 707/2 |
| 6,708,186 | B1 | 3/2004 | Claborn et al. | 707/102 |
| 6,708,196 | B1 | 3/2004 | Atkinson et al. | 718/102 |
| 6,772,178 | B2 | 8/2004 | Mandal et al. | 707/204 |
| 6,785,690 | B1 | 8/2004 | Davidson | 707/103 Y |
| 6,850,893 | B2 | 2/2005 | Lipkin et al. | 705/8 |
| 2002/0091702 | A1 | 7/2002 | Mullins | 707/100 |
| 2002/0152422 | A1 | 10/2002 | Sharma et al. | 714/13 |
| 2002/0198891 | A1 | 12/2002 | Li et al. | 707/102 |
| 2003/0167277 | A1 | 9/2003 | Hejlsberg et al. | 707/102 |
| 2005/0125401 | A1 | 6/2005 | Carr et al. | 707/5 |

OTHER PUBLICATIONS

Jianguo Lu et al., Automated EJB client code generation using database query rewriting, Jul. 16-18, 2003, IEEE, 308-317.*

Andrews, T. et el., "Combining Language and Database Advances in an Object-Oriented Development Environment", *OOPSLA Proceedings*, Oct. 4-8, 1987, 430-440.

Bhattacharya, S. et al., "Coordinating Backup/Recovery and Data Consistency Between Database and File Systems", *ACM SIGMOD*, Jun. 4-6, 2002, 500-511.

Biliris, A., "The Performance of Three Database Storage Structures for Managing Large Objects", *ACM SIGMOD*, 1992, 276-285.

Buneman, P. et al., "Inheritance and Persistence in Database Programming Languages", *ACM*, 1986, 4-15.

Findler, R.B. et al., "Contract Soundness for Object-Oriented Languages" ACM Conference on Object-Oriented Programming Systems, Languages, and Applications, *OOPSLA*, 2001, 15 pages.

Harrison, C.J. et al., Structure Editors: User-Defined Type Values and Type Inference, *IEEE*, 2000, 241-247.

Hsiao, H.I. et al., "DLFM: A Transactional Resource Manager", *MOD*, 2000, 518-528.

Khan, L. et al., "A Performance Evaluation of Storing XML Data in Relational Database Management Systems", *WIDM*, 2001, 31-38.

Leontiev, Y. et al., "On Type Systems for Object-Oriented Database Programming Languages", *ACM Computing Surveys*, Dec. 2002, 34(4), 409-449.

Melton, J. et al., "SQL and Management of External Data", *SIGMOD Record*, Mar. 2001, 30(1), 70-77.

Papiani, M. et al., A Distributed Scientific Data Archive Using the Web, XML and SQL/MED, *SIGMOD Record*, Sep. 1999, 28(3), 56-62.

Seshadri, P., "Enhanced Abstract Data Types in Object-Relational Databases", *The VLDB Journal*, 1998, 7, 130-140.

Varlamis, I. et al., "Bridging XML-Schema and Relational Databases. A System for Generating and Manipulating Relational Databases Using Valid XML Documents", *DocEng 'OL*, Nov. 9-10, 2001, 105-114.

Yoshikawa, M. et al., "XRel: A Path-Based Approach to Storage and Retrieval of XML Documents Using Relational Databases", *ACM Transactions on Internet Technology*, Aug. 2001, 1(1), 110-141.

Michael Stonebraker, "Inclusion of New Types in Relational Data Base Systems", *IEEE International Conference on Data Engineering*, 1986, 1-19.

Berg, C., "How Do I Create Persistent Java Objects?", *Dr. Dobb's Journal*, 1997, 22(4), 98-101.

Chien, A.A., "Concurrent Aggregates (CA)-Design and Experience with a Concurrent Object-Oriented Language Based on Aggregates", *J. Parallel and Distributed Computing*, 1995, 25(2), 174-196.

Darby, C., "Object Serializatin in Java 1.1. Making Objects Persistent", *Web Techniques*, 1997, 2(9), 55, 58-59.

Frost.,"Binary-Relational Storage Structures", *The Computer Journal*, 1982, 25(3), 358-367.

Fuh, Y-C. et al., "Implementation of SQL3 Structured Types with Inheritance and Value Substitutability", *Digital Symposium Collection*, 2000, Abstract Only, 2 pages.

Haverlock, K., "Object Serialization, Java, and C++", *Dr. Dobbs. Journal*, 1998, 23(8), 32, 34, 36-37.

King, et al., "TriStarp—An Investigation into the Implementation and Exploitation of Binary Relational Storage Structures", *Proc. 8 Suppl BNCOD(British National Conference on Data Bases)*, 1990, 64-84.

Aksit, M. et al., "Solving the Modeling Problems of Object-Oriented Languages by Composing Multiple Aspects using Composition Filters", *OOPSLA AOP*, 1998, 1-7.

Barry, D. et al., "Solving the Java Object Storage Problem", *IEEE*, 1998, 31(1), 33-40.

In the United States Patent and Trademark Office:, In re: U.S. Appl. No. 10/775,282, Notice of Allowance and Fee(s) Due dated May 20, 2005, 13 pages.

In the United States Patent and Trademark Office:, In re: U.S. Appl. No. 10/775,982, Non-Final Office Action dated Aug. 20, 2007, 20 pages.

Sattler, K-U. et al., "A Data Preparation framework based on a Multidatabase Language", *Database Engineering & Applications*, 2001, International Symposium, 219-228.

Schallehn, E. et al., "Advanced Grouping and Aggregation for Data Integration", *Proceedings of the 10th International Conference on Information and Knowledge Management*, 2001, 547-549.

Soloviev, V., "An Overview of Three Commercial Object-Oriented Database Management Systems: ONTOS, ObjectStore, and 02", *Sigmod Record*, 1992, 21(1), 93-104.

In the United States Patent and Trademark Office:, In re: U.S. Appl. No. 10/775,982, Reply Responsive to Office Action dated Aug. 20, 2007, 16 pages.

* cited by examiner

```
[SqlUserDefinedType (Format.Native)]
public class Point
{
        float x;
        float y;

public Bool IsNull {get; }
        public static Point Null {get; } public String ToString()
        public Static Point Parse (SqlString s)
}
```

Figure 2

```
0000: (04)    ldarg.2
0001: (15)    ldc.i4.m1
0002: (05)    ldarg.3
0003: (28)    call      06000113 (Point, geometry, Version=0.0.0.0,
Culture=neutral, PublicKeyToken=0f152244995ad2ef::Deserialize)
0008: (04)    ldarg.2
0009: (1F)    ldc.i4.s  24
000B: (58)    add
000C: (15)    ldc.i4.m1
000D: (05)    ldarg.3
000E: (28)    call      06000113 (Point, geometry, Version=0.0.0.0,
Culture=neutral, PublicKeyToken=0f152244995ad2ef::Deserialize)
0013: (6F)    callvirt  0A00008E (Distance)
0018: (0A)    stloc.0
0019: (03)    ldarg.1
001A: (06)    ldloc.0
001B: (28)    call      0A00003B (CallData_Int32ToI4)
0020: (DD)    leave     0025
0025: (2A)    ret
0026: (28)    call      0A000004 (CallData_CopyCLRExceptionInfoToNonManaged)
002B: (DD)    leave     0030
0030: (2A)    ret
```

Figure 3

```
0000: (04)      ldarg.2
0001: (15)      ldc.i4.m1
0002: (05)      ldarg.3
0003: (28)      call       06000113 (Point, geometry, Version=0.0.0.0,
Culture=neutral, PublicKeyToken=0f152244995ad2ef::Deserialize)
0008: (0A)      stloc.0
0009: (06)      ldloc.0
000A: (04)      ldarg.2
000B: (1F)      ldc.i4.s   24
000D: (58)      add
000E: (46)      ldind.i1
000F: (39)      brfalse    002D
0014: (20)      ldc.i4     6569
0019: (17)      ldc.i4.1
001A: (1F)      ldc.i4.s   20
001C: (18)      ldc.i4.2
001D: (20)      ldc.i4     1133834472
0022: (28)      call       0600000F (Method_RaiseSpecificError)
0027: (73)      newobj     0A000003 (Ctor_ControlFlowException)
002C: (7A)      throw
002D: (04)      ldarg.2
002E: (1F)      ldc.i4.s   24
0030: (58)      add
0031: (28)      call       0A000039 (CallData_I4ToInt32)
0036: (6F)      callvirt   0A00008D (set_X)
003B: (03)      ldarg.1
003C: (20)      ldc.i4     61443
0041: (54)      stind.i4
0042: (06)      ldloc.0
0043: (39)      brfalse    0053
0048: (06)      ldloc.0
0049: (6F)      callvirt   0A00008C (Point, geometry, Version=0.0.0.0,
Culture=neutral, PublicKeyToken=0f152244995ad2ef::IsNull)
004E: (39)      brfalse    005F
0053: (03)      ldarg.1
0054: (20)      ldc.i4     61443
0059: (54)      stind.i4
005A: (38)      br         00CA
005F: (20)      ldc.i4     8000
0064: (8D)      newarr     0100002E (Type_System_Byte)
0069: (73)      newobj     0A000011 (Ctor_SqlBytes_With_ByteArray)
006E: (0B)      stloc.1
006F: (06)      ldloc.0
0070: (74)      castclass  01000032 (Interface_IBinarySerialize)
0075: (07)      ldloc.1
0076: (28)      call       0A000010 (CallData_SqlBytes_GetStream)
007B: (0C)      stloc.2
007C: (08)      ldloc.2
007D: (73)      newobj     0A000006 (Ctor_BinaryWriter)
0082: (28)      call       0A000088 (Point, geometry, Version=0.0.0.0,
Culture=neutral, PublicKeyToken=0f152244995ad2ef::Write
```

Figure 5A

```
0087: (14)    ldnull
0088: (0D)    stloc.3
0089: (07)    ldloc.1
008A: (28)    call       0A000015 (PropGet_SqlBytes_IsNull)
008F: (39)    brfalse    009C
0094: (16)    ldc.i4.0
0095: (13)    stloc.s    4
0097: (38)    br         00AC
009C: (07)    ldloc.1
009D: (28)    call       0A000013 (PropGet_SqlBytes_Buffer)
00A2: (0D)    stloc.3
00A3: (08)    ldloc.2
00A4: (6F)    callvirt   0A000019 (CallData_Stream_Prop_Position)
00A9: (69)    conv.i4
00AA: (13)    stloc.s    4
00AC: (09)    ldloc.3
00AD: (11)    ldloc.s    4
00AF: (03)    ldarg.1
00B0: (20)    ldc.i4     8000
00B5: (17)    ldc.i4.1
00B6: (17)    ldc.i4.1
00B7: (20)    ldc.i4     257
00BC: (16)    ldc.i4.0
00BD: (28)    call       0A000009 (CallData_XVariantFromSqlBytesBuffer)
00C2: (26)    pop
00C3: (03)    ldarg.1
00C4: (20)    ldc.i4     61440
00C9: (54)    stind.i4
00CA: (DD)    leave      00CF
00CF: (2A)    ret
00D0: (28)    call       0A000004
(CallData_CopyCLRExceptionInfoToNonManaged)
00D5: (DD)    leave      00DA
00DA: (2A)    ret
```

Figure 5B

| Column name | Data Type | Description |
| --- | --- | --- |
| name | sysname | Name of type, unique within the schema. |
| user_type_id | int | Id of type, unique within the database. |
| schema_id | int | Id of schema to which type belongs. |
| principal_id | int | Id of individual owner if different from schema owner. |
| system_type_id | tinyint | Id of type's internal system-type. |
| max_length | smallint | Maximum length of type in bytes. |
| precision | tinyint | Maximum precision of type if numeric-based, else 0. |
| scale | tinyint | Maximum scale of type if numeric-based, else 0. |
| collation_name | sysname | Name of type's collation if character-based, else NULL. |
| is_nullable | bit | 1 if type is nullable, else 0. |
| is_user_defined | bit | 1 if this is a user-defined type. 0 if this is a built-in type that ships with SQL Server. |
| is_assembly_type | bit | 1 if this is a type whose implementation is defined in a CLR assembly. 0 if this type is based on native SQL Server types. |
| default_object_id | int | Id of the stand-alone default bound to the type via sys.sp_bindefault |
| rule_object_id | int | Id of the stand-alone rule bound to the type via sys.sp_bindrule |

Figure 6

| Column Name | Data Type | Description |
| --- | --- | --- |
| assembly_id | int | Id of assembly from which this type was created. |
| assembly_class | sysname | Name of class within assembly which defines this type. |
| is_binary_ordered | bit | Sorting the bytes of this type is equivalent to sorting using comparison operators on type. |
| is_fixed_length | bit | Length of type is always same as max_length. |
| prog_id | nvarchar (40) | ProgID of the type as exposed to COM |

Figure 7

SYSTEM AND METHOD FOR PROVIDING USER DEFINED TYPES IN A DATABASE SYSTEM

CROSS-REFERENCE TO RELATED APPLICATIONS

This is a continuation of application Ser. No. 10/775,282, filed Feb. 10, 2004. The subject matter of this application is related the subject matter of co-pending, commonly assigned, patent application Ser. No. 10/775,982, filed Feb. 10, 2004, entitled "System and Method for Providing User-Defined Aggregates in a Database System".

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention relates to data storage in a computer system, and more particularly, to a system and method for providing user-defined types in a database system.

BACKGROUND

MICROSOFT SQL SERVER is a comprehensive database management platform that provides extensive management and development tools, a powerful extraction, transformation, and loading (ETL) tool, business intelligence and analysis services, and other capabilities. Among other improvements, the MICROSOFT WINDOWS .NET Framework Common Language Runtime (CLR) recently has been integrated into the SQL SERVER database.

The CLR is the heart of the MICROSOFT .NET Framework, and provides the execution environment for all .NET code. Thus, code that runs within the CLR is referred to as "managed code." The CLR provides various functions and services required for program execution, including just-in-time (JIT) compilation, allocating and managing memory, enforcing type safety, exception handling, thread management and security. The CLR is now loaded by SQL SERVER upon the first invocation of a .NET routine.

In previous versions of SQL SERVER, database programmers were limited to using Transact-SQL when writing code on the server side. Transact-SQL is an extension of the Structured Query Language ("SQL") as defined by the International Standards Organization (ISO) and the American National Standards Institute (AINSI). Using Transact-SQL, database developers can create, modify and delete databases and tables, as well as insert, retrieve, modify and delete data stored in a database. Transact-SQL is specifically designed for direct structural data access and manipulation. While Transact-SQL excels at structural data access and management, it is not a full-fledged programming language as are VISUAL BASIC .NET and C#. For example, Transact-SQL does not support arrays, collections, for each loops, bit shifting or classes.

With the CLR integrated into the SQL SERVER database, database developers can now perform tasks that were impossible or difficult to achieve with Transact-SQL alone. Both VISUAL BASIC .NET and C# are modern programming languages offering full support for arrays, structured exception handling, and collections. Developers can leverage CLR integration to write code that has more complex logic and is more suited for computation tasks using languages such as VISUAL BASIC .NET and C#. These programming languages offer object-oriented capabilities such as encapsulation, inheritance and polymorphism. Related code can be easily organized into classes and namespaces.

Managed code is better suited than Transact-SQL for number crunching and complicated execution logic, and features extensive support for many complex tasks, including string handling and regular expressions. With the functionality found in the .NET Framework Base Class Library (BCL), database developers have access to thousands of pre-built classes and routines which can be easily accessed from any stored procedure, trigger or user defined function.

Another benefit of managed code is type safety. Before managed code is executed, the CLR verifies that the code is safe. This process is known as "verification." During verification, the CLR performs several checks to ensure that the code is safe to run. For example, the code is checked to ensure that no memory is read that has not be been written to. The CLR will also prevent buffer overflows.

When writing managed code, the deployment unit is called an assembly. An assembly is packaged as a dynamic link library (DLL). Managed DLL assemblies can be loaded into and hosted by SQL SERVER. The CREATE ASSEMBLY statement is used to register an assembly in the server. Here is an example:

CREATE ASSEMBLY YukonCLR
FROM 'C:\MyDBApp\YukonCLR.dll'

The FROM clause specifies the pathname of the assembly to load.

SQL SERVER has traditionally supported "built-in" scalar types such as integer, floating point number, date, time, and character string. These built-in types also come with a set of built-in operations such as +, −, *, / as well as built-in functions over these types. These types, operations, and functions are "built-in" in the sense that they are implemented and packaged by the product and users cannot define their own types.

It would be desirable for a database system, such as SQL SERVER, to allow users to extend the type system of the database system, such that users could create new types that act as scalar types in the database system, but that contain more complex structure and behavior. For example, it may be desirable for a user to create a "Point" type consisting of X and Y coordinates.

The SQL standard and some database management system (DBMS) products have used the term "user-defined type" (UDT) to describe several forms of type extensibility. For example, the SQL-99 standard describes a "distinct type," which is a type that can be defined by a user to have an internal representation that is a value of an existing SQL built-in data type. A distinct type may optionally share comparison and arithmetic operators, type conversions, and aggregate (column) functions (e.g., max, min, average) with an existing scalar type. The distinct type may allow constraints to be defined on its values. In addition, a distinct type may expose behaviors beyond those of an existing scalar type by defining new functions specific to the distinct type via user-defined functions. With respect to type checking, the distinct type and existing scalar types are considered to be different types.

The main advantage of distinct types is ease of definition. If the internal representation of the new type has a single data member that can be described with an existing built-in type and the built-in type already implements most of the behaviors required on the new type, then distinct types are an attractive alternative. The user does not have to worry about implementing the behaviors required to manage the on-disk storage of the type, constructors, comparison operators (used for ordering and indexing), arithmetic operators, and type conversion (casting) operators. The user only needs to choose what functionality of the underlying built-in type needs to be exposed on the distinct type and optionally add constraints on values or additional functions on the new type. Another advantage of distinct types is that all of the query processing available for built-in types, such as computation of histograms, can be readily used on columns of distinct types. A disadvantage of distinct types, however, is that they can not easily be used to create more complex types.

The SQL-99 standard also described a "structured type," which is a type that can be defined by user and that has an internal representation that is a collection of data members, each of which may be of a different SQL built-in or user defined type. This is similar to the notion of a struct in C/C++. SQL-99 describes a style for defining structured types by which a user only needs to define the type in terms of its internal structure. The system automatically generates accessor and mutator functions on its data members, constructor, and functions to manage the on-disk representation of instances of the type.

The main advantages of structured types as defined in SQL are ease of definition of basic behaviors of the type, and flexibility to define more complex types. The disadvantage is complexity of definition of type-specific methods, which are usually defined via external functions written in a general-purpose programming language like C/C++. In order to define a structured type fully, the definer of the type needs to straddle a line between SQL and some other programming language.

While the distinct type and structured type features of SQL 99 offer some advantages to users in terms of enabling them to extend the existing scalar type system of a SQL database, there is a need for an improved system and method for enabling a user to extend the scalar type system of a database system through user-defined types that act as scalar types but that contain more complex structure and behavior. The present invention satisfies this need.

SUMMARY

The present invention is directed to a system and method that allows a user to extend the scalar type system of a database system by creating user-defined types that act as scalar types but that contain more complex structure and behavior. According to the invention, a user writes program code in a high-level programming language that implements a class that defines the structure of a user-defined type and methods that can be invoked on instances of the user-defined type. As used herein and in the claims, the term "structure," when referring to a user-defined type, encompasses the set of fields or properties that implement the type. In one embodiment, the type of each field can be a scalar SQL type or any previously defined user-defined type. The class defining a user-defined type is then compiled and registered with the database system. Specifically, in one embodiment, a CLR class defining a user-defined type is compiled into an assembly which is then registered with the database system via a CREATE ASSEMBLY data definition statement. After the assembly is registered, a user can register the class within the assembly that defines the user-defined type using a CREATE TYPE data definition statement.

Further according to the present invention, the database system enforces a specific contract that the class must implement to enable the user-defined type to act as a scalar in the SQL type system. The term "contract," as used herein and in the claims, refers to a technique that is used at runtime in object-oriented programming environments to check that code to be executed satisfies certain pre-conditions or requirements to ensure that it will execute properly. According to the present invention, the contract against which a class that defines a user-defined type is compared comprises the following requirements. First, the class must specify one of a plurality of different formats for persisting instances of the user-defined type in a database store. Second, the class must be capable of returning a null value for the user-defined type. Third, the class must provide a method for converting the user-defined type to and from another type, such as a string type. Once these requirements are satisfied, the database system enables instances of the user-defined type to be created. In one embodiment, the user-defined type can be instantiated as a column value in a table, a variable, a parameter of a routine, or a return value of a routine. The database system stores metadata about the class defining the user-defined type for subsequent use in creating instances of the type. Also, in one embodiment, the verification of the user-defined type contract is performed using the metadata describing the class that defines the type.

In one embodiment, the plurality of different formats for persisting instances of the user-defined type comprises a first format in which an instance of the user-defined type is automatically serialized in accordance with a native format of the database system, and a second format in which an instance of the user-defined type is serialized in a manner defined by the user authored class. Additionally, when the present invention is embodied within MICROSOFT SQL SERVER, in which the MICROSOFT .NET CLR is integrated, a third format is available in which an instance of the user-defined type is serialized in accordance with a method provided by the MICROSOFT .NET Framework.

Further according to the present invention, expressions in the query language of the database system can include one or more references to an instance(s) of a user-defined type, such that evaluation of the expression requires invocation of a method on the instance of the user-defined type. When the database system receives such a query language expression, it translates the expression into a sequence of program code instructions that, when executed, invoke the required method on the instance of the user-defined type. The database system then returns the result of the method invocation as the result of evaluation of the query language expression. In one embodiment, the instance of the user-defined type is deserialized prior to invoking the method on the instance.

Another feature of the present invention is the ability to change the value of an instance of a user defined type through invocation of a mutator method. Specifically, the author of the class that defines the user-defined type includes a mutator method as part of the class. When invoked on an instance of the user-defined type, the mutator method enables a value of the user-defined type to be changed. In one embodiment, this process comprises deserializing the instance of the user-defined type, invoking the mutator method to change the value of the deserialized data of the instance, and then serializing the modified instance of the user-defined type to persist the changes.

According to yet another feature of the invention, the class defining a user-defined type may further contain an attribute that specifies that serialized binary representations of instances of the user-defined type will be binary ordered. This allows binary comparisons to be made on instances of the type and also enables indexing to be performed on instances of the type. Specifically, for instances of a user-defined type that are binary ordered, when a query language expression that requires some comparison of two instances of the type is received by the database system (e.g., >, <, or =), the serialized binary representations of the two instances can be used to evaluate the expression, without deserializing either instance. Additionally, for a user-defined type that is binary ordered, a table in the database store can be created that has a column defined as the user-defined type. An index can then be created on the column. An index can also be created over a query language expression that references the user-defined type. In this case, a computed column is first generated over the expression, and then an index is created over the computed column.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIG. 2 is a pseudo-code listing of an exemplary class definition for a user-defined type, in accordance with one embodiment of the present invention;

FIG. 3 is a listing of a series of program code instructions generated in accordance with an aspect of one embodiment of the present invention;

FIG. 5A is a first portion of a listing of a series of program code instructions generated in accordance with another aspect of one embodiment of the present invention;

FIG. 5B is a continuation of the program code listing of FIG. 5A;

FIG. 6 is a table illustrating certain metadata stored in a database system catalog, in accordance with an embodiment of the present invention;

FIG. 7 is another table illustrating additional metadata stored in the database system catalog in accordance with an embodiment of the present invention;

DETAILED DESCRIPTION OF THE INVENTION

Figure 1:
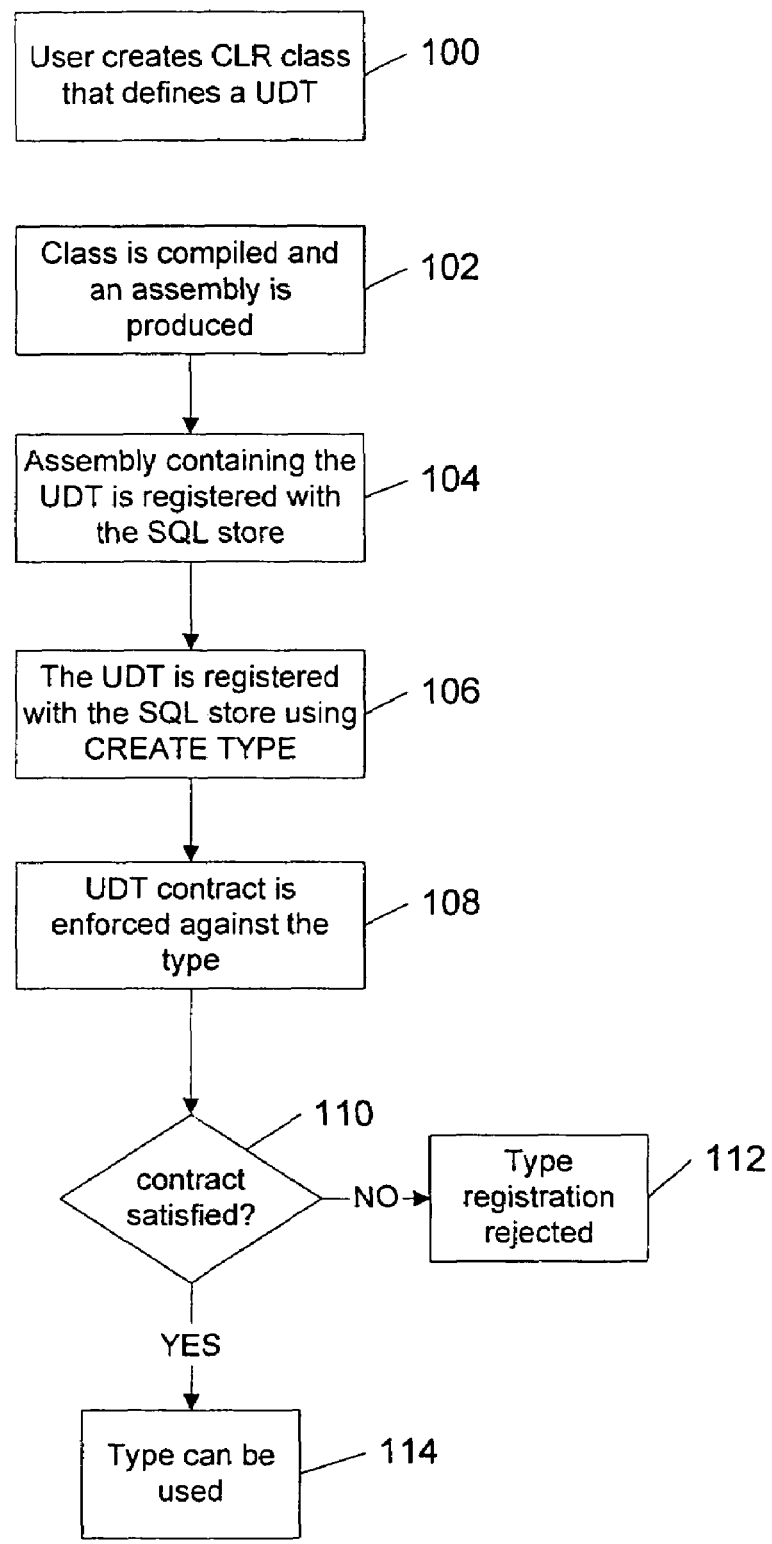
FIG. 1 is a flow diagram illustrating one aspect of a method of the present invention, in accordance with one embodiment thereof.

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The above Summary provides an overview of the features of the invention. A detailed description of one embodiment of the invention follows. In the embodiment described below, the foregoing features of the present invention are described as implemented in the MICROSOFT SQL SERVER database system. As mentioned above, SQL SERVER incorporates the MICROSOFT .NET Common Language Runtime (CLR) to enable managed code to be written and executed to operate on the data store of a SQL SERVER database. While the embodiment described below operates in this context, it is understood that the present invention is by no means limited to implementation in the SQL SERVER product. Rather, the present invention can be implemented in any database system that supports the execution of object-oriented programming code to operate on a database store, such as object oriented database systems and relational database systems with object relational extensions. Accordingly, it is understood that the present invention is not limited to the particular embodiment described below, but is intended to cover all modifications that are within the spirit and scope of the invention as defined by the appended claims.

Creating a User-Defined Type

As stated above, according to the invention, a user writes program code in a high-level programming language that implements a class that defines the structure (e.g., the fields or properties of the class) of a user-defined type (UDT) and the methods that can be invoked on instances of the type. In the present embodiment, the class is written in a high-level programming language supported by the MICROSOFT .NET CLR, such as MICROSOFT VISUAL BASIC .NET or C#. The class file is annotated with a custom attribute called SqlUserDefinedType( ) to identify it as a class definition for a UDT.

In the present embodiment, the SqlUserDefinedType( ) attribute has the following properties:

Format—this is the storage format of the LDT, described more fully below;

MaxByteSize—this is the maximum size of an instance of the UDT, in bytes;

IsFixedLength—this property has a value of true or false and indicates whether all instances of the UDT have the same length; and IsByteOrdered—this property has a value of true or false and indicates whether the serialized binary representation of instances of the UDT are binary ordered, as discuss more fully below. In other embodiment, there may be fewer or more properties included in the SqlUserDefinedType( ) attribute.

Further according to the present invention, the class must meet the requirements of a specific contract. The contract is enforced against the class when the user attempts to register the class with the database system. The term "contract," as used herein and in the claims, refers to a teclinique that is used at runtime in object-oriented programming environments to check that code to be executed satisfies certain pre-conditions or requirements to ensure that it will execute properly. According to the present embodiment, the contract against which a class that defines a user-defined type is compared comprises the following requirements.

First, the class must specify one of a plurality of different formats for persisting (i.e., storing) instances of the user-defined type in a database store, i.e., the format that the SQL engine will use to store instances of the UDT on disk. As mentioned above, in the present embodiment, the persistence format (sometimes also referred to as the "storage format") is specified using the Format property of the SqlUserDefined-Type( ) custom attribute. The following storage formats are available to the class author:

Format=Native. When this format is specified, the SQL Server engine will use an efficient native representation on disk. In the present embodiment, this is the most compact and efficient format option. Additional requirements for specifying this format are (i) that the class has to also be annotated with a StructLayout.LayoutKindSequential custom attribute, (ii) all the fields of the UDT should be blittable, (iii) the type should not specify a value for MaxByteSize, (iv) the type should not have any [NonSerialized] fields, and no field should be marked as an explicit layout. A "blittable" type is a type that has a common representation in both managed and unmanaged memory. Such types do not require conversion when passed between managed and unmanaged code.

Format=UserDefined. When this format is specified, the class author must provide code for handling the storage of instances of the UDT. This gives full control over the binary format to the author. Additional requirements for specifying this format are (i) the class must implement the IBinarySerialize interface, and (ii) the class must specify a value for the MaxByteSize property.

Format=SerializedDataWithMetadata. This format stores instances of the UDT in accordance with the serialization options provided by the MICROSOFT .NET Framework. Also, with this format, serialization metadata is stored along with each instance of the type. Additional requirements for specifying this format are (i) the class should be annotated with the [Serializable] attribute, and (ii) the class must specify a value for MaxByteSize.

A second requirement of the UDT contract, according to the present invention, is that the class must be capable of returning a null value for the user-defined type. That is, the type should be NULL-aware; it should recognize the NULL value as a valid value of the type. In the present embodiment, this imposes two requirements on the class author: (1) the class should implement the System.Data.SqlTypes.INullable interface containing a single method IsNull( ), and (ii) the class should have a static property called Null that returns the null value for the type. Also in the present embodiment, the instance of the UDT that represents the null value should be immutable. If the UDT is mutable, the property should create a new instance and return it. For example, public static<type>Null{get; }. Implementing the INullable interface gives the UDT author control over the implementation of nullability for the type.

A third requirement of the UDT contract, according to the present invention, is that the class provide a method for converting the user-defined type to another type. Specifically, in the present embodiment, the class should support string conversion by implementing methods with the following signatures:

public String ToString( ); and public static<type>Parse(SQLString s).

Other conversions can be included such as conversions to/from a binary type and to/from eXtensible Markup Language (XML).

FIG. 1 is a flow diagram illustrating one embodiment of a method for registering a UDT with a database system, such as, in the present embodiment, the MICROSOFT SQL SERVER database system. As shown at step 100, the process begins with a user creating a CLR class definition for a new UDT. As mentioned above, the class must be annotated with the SqlUserDefinedType( ) custom attribute and it must satisfy the requirements of the contract for UDTs in accordance with the present invention. FIG. 2 is an exemplary pseudo-code listing for a class that defines a user-defined type called "Point." This UDT will be used to represent a point on an x-y coordinate system. As shown, the type has data members "x" and "y" which represent the coordinate values of a point. As required by the UDT contract, the type supports the Null value and includes methods for string conversion.

Referring again to FIG. 1, once the program code for the class has been created, the class is compiled and an assembly is produced at step 102. Next, at step 104, the assembly containing the type is registered with the SQL SERVER store using a CREATE ASSEMBLY DDL statement. At step 106, the type is registered with SQL via the CREATE TYPE statement. During type creation, as shown at step 108, the system ensures the UDT contract is fully implemented by the class implementing the type. If the contract is satisfied, then as shown at step 114, a UDT is created over the managed type. As part of the type creation and validation process, the facets (fields and methods) of the UDT are validated and information is imported into the database system catalog that describes the structure of the type and its methods. Once this process is complete, the type is registered and can be used to define columns of a table, variables and parameters in stored procedures, functions, and triggers. If the UDT contract is violated, then as shown at step 112, the attempt to register the type will be rejected and an error will reported to the user.

Using a UDT

As mentioned above, in the present embodiment, a properly registered UDT can be instantiated as a column value in a table, a variable, a parameter of a routine, or a return value of a routine. Indeed, in the present embodiment, a UDT can be used in all contexts where any other built-in type can be used. This includes defining columns of tables, declaring variables and parameters to functions and stored procedures in Transact-SQL, and evaluating expressions of the UDT in SQL queries and updates. Further according to the invention, SQL query and DML statements can include references to the properties of a UDT using dot-notation. In the present embodiment, when a SQL expression involving UDTs is compiled (e.g., Point.ToString( )) an expression service of the database system translates the operation into a sequence of assembly instructions—using the .NET Intermediate Language (IL)—which are invoked at execution time. The IL instructions generated implement a marshalling mechanism for input arguments as well as return values during the invocation of a UDT method.

Tables

Tables can have columns of user-defined types. In the present embodiment, the CREATE/ALTER TABLE statement of the T-SQL language is extended to allow the type of a column to be defined as a user-defined type. The syntax of the statement is as follows:

```
<column_definition> ::=
    column-name data-type
        [ COLLATE < collation-name > ]
        [ { DEFAULT constant-expression
            | IDENTITY [ ( seed , increment )
                [ NOT FOR REPLICATION ] ] ]
          }
        ]
        [ ROWGUIDCOL ]
        [ < column-constraint > ] [ ...n ]
<data_type> ::=
    <sql-server-native-type>
    | [ type-schema-name. ] type-name
``` where, the type-schema-name.type-name is the name of the registered type (e.g., Point).

With this syntax, in the present embodiment, a user executing CREATE/ALTER type should have REFERENCES permission on the type specified. If the type specified for the column is a UDT, then the COLLATE, IDENTITY and ROWGUIDCOL clauses cannot be specified. If the DEFAULT value is specified for a UDT column, then the type should support an implicit conversion from the type of the <constant-expression> to the UDT. Further according to the present embodiment, for a column of type UDT, the following constraint types can be specified as <column-constraint>: [NOT] NULL, PRIMARY KEY, FOREIGN KEY, UNIQUE or CHECK. If PRIMARY KEY, FOREIGN KEY or UNIQUE constraints are specified, then the UDT should support ordering as described more fully below. CHECK constraints can be expressed in terms of a Boolean-valued expression that operates on the UDT instance. It is understood that in other embodiments, the syntax for defining a column of a table as a user-defined type, and the rules associated therewith, may differ.

Variables and Parameters

A T-SQL variable or the parameter of a T-SQL or .NET function or procedure can be declared to be of a user-defined type. Continuing the example of FIG. 2, a variable, @p, can be declared in T-SQL as type Point as follows:

declare @p Point
SET @p=convert (Point, '1, 2')

The first line declares the variable, @p, to be of type Point (the UDT defined by the class illustrated in FIG. 2). The second line compiles to IL code that invokes the parse( ) method of the type to convert the string "1, 2" to type Point to establish the initial values of the x and y data members of the new instance of type Point.

By way of further example, assume that the class definition for the UDT Point also included a method called distance( ) that, when given x-y coordinates for a second point, will compute the distance of a particular instance of type Point to that second point in the x-y coordinate system. The following is an example SQL query expression that references this method on an instance of the UDT Point:

SELECT @p.distance(@p2).

According to a further aspect of the invention, when the expression service of the database system evaluates this expression, it translates the expression into a sequence of program code instructions (IL instructions in the present embodiment) that, when executed, invoke the required method on the instance of the user-defined type. The database system then returns the result of the method invocation as the result of evaluation of the query language expression. For example, in accordance with the present embodiment, the expression above will be translated into the sequence of IL instructions shown in FIG. 3. This example assumes that the user-defined type Point implements IbinarySerialize. A pseudo-code representation of this IL code is as follows:

Deserialize UDT (binary of p2)
Push Udt Param p2
Deserialize UDT (binary of P1)
Push Udt Param p1
Invoke method distance( )
Pop result
Return result to SQL When executed, this series of IL instructions will perform the following steps. First, the stored instance of variable @p2 will be deserialized, and its data members will be pushed onto the runtime stack. Next, the stored instance of variable @p1 will be deserialized, and its data members will be pushed onto the runtime stack. The CLR will then invoke the distance ( ) method on the UDT instance @p1. The result will then be popped from the runtime stack and returned to SQL as the result of the evaluation of the expression.

Figure 4:
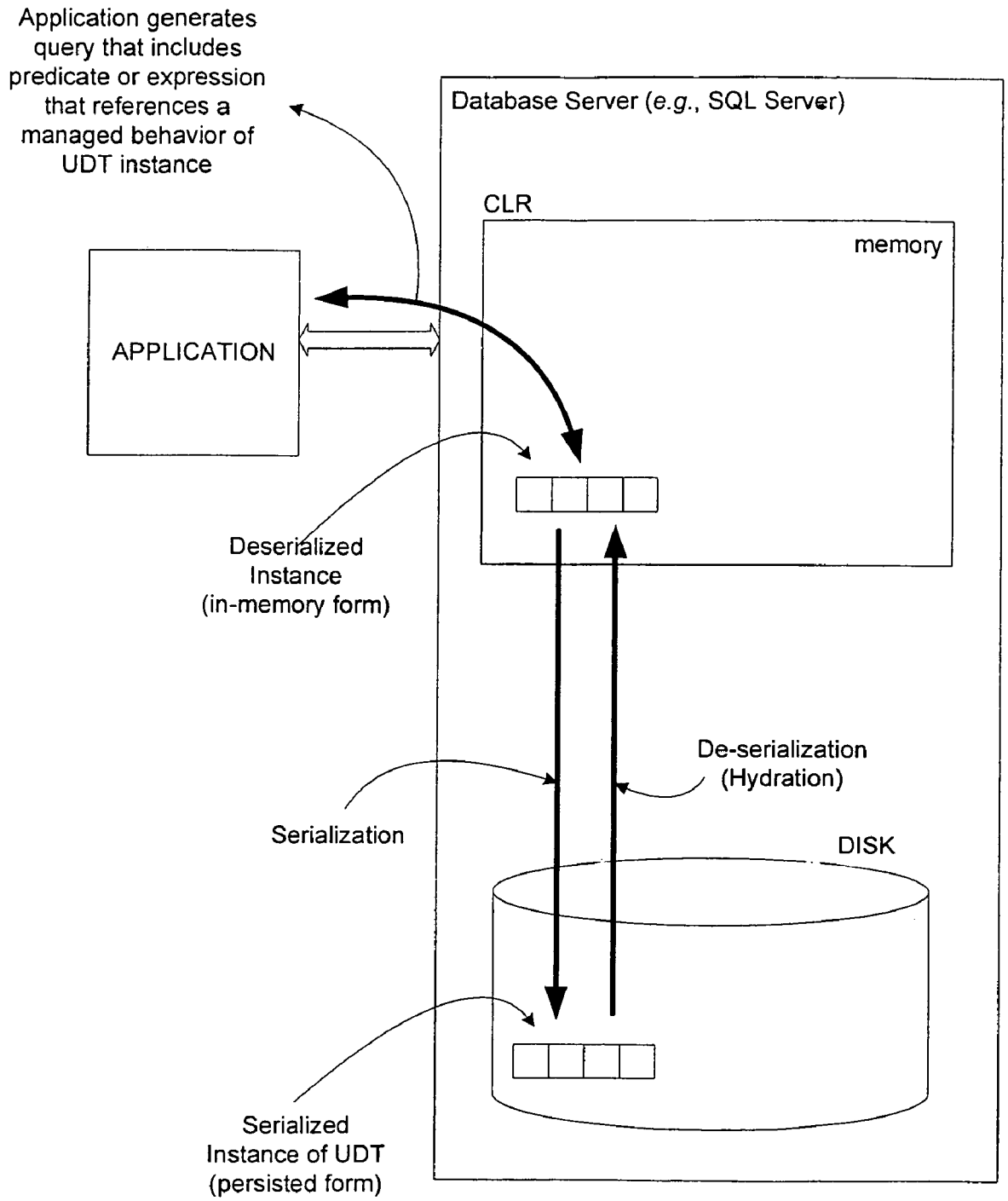
FIG. 4 is a block diagram illustrating the serialization and deserialization of an instance of a user defined type that has been instantiated in managed code.

FIG. 4 is a block diagram illustrating the serialization and deserialization of an instance of a user defined type. As shown, an instance of a user-defined type is persisted on disk through serialization of the object representing the instance in memory. When an application generates a query that includes a predicate or expression that references a method of an instance of a UDT, the persisted form of the instance is de-serialized (a process also referred to as "hydration") and the CLR allocates memory for the full object in order to receive its stored values. The CLR then invokes the appropriate method on the object that implements the behavior desired by the application or user.

Operations on Instances of a UDT

The methods of a UDT can be invoked using the syntax:
    method-invocation::=instance-name.method-name (argument 1 [, . . . ]). Properties and data members of an instance of a UDT can be retrieved using the following syntax:
    member-retrieval::=instance-name.{property-name|public-member-name}.

In the present embodiment, the "instance-name" can refer to a variable, column or parameter of type UDT that is in the scope of the context of invocation. "Method-name" should refer to a non-static public method of the given UDT. If "property-name" is specified, it should refer to a public property name in the UDT. In the present embodiment, the database engine implements a property retrieval using the corresponding Getter method of that property. If "public-member-name" is specified, then it should refer to a public data member in the UDT.

Method invocations and Property retrievals can appear anywhere a scalar expression can appear in the language. The type of the invocation would be the return value of the method and the type of a property retrieval would be the type of the property as defined by the type. For example, consider the following table definition:

Create table Cities (
    Name varchar (20),
    State varchar (30),
    Location Point)

The distance of the cities from co-ordinates (32,23) can be retrieved as follows:

Declare @p Point (32, 23), @distance float
Select Location.Distance (@p)
From Cities Modifying Instances of a UDT Another feature of the present invention is the ability to change the value of an instance of a user defined type through invocation of a mutator method. Specifically, the author of the class that defines the user-defined type includes a mutator method as part of the class. When invoked on an instance of the user-defined type, the mutator method enables a value of the user-defined type to be changed. In the present embodiment, to support this feature, a class author can identify a method of a UDT class as a mutator method by adding a custom annotation, called SQLMethod( ) to the method definition. One of the properties of the SQLMethod( ) attribute is called Mutator. It can have a value of "true" or "false". For example, to identify a particular method of a class as a mutator method, the following annotation is added to the method definition in the class:

[SQLMethod(Mutator=True)]

When a query language expression that sets or changes a value of a data member of a UDT is evaluated, it gets translated to a set of IL instructions that invoke the mutator method of the class to make the change. For example, when the following query language expression is evaluated:

SET @p.y=1, the expression service of the database system translates the expression into the series of IL code instructions illustrated in FIGS. 5A and 5B. When executed, this series of IL instructions will perform the following steps. First, the stored instance of variable @p will be deserialized, and its data members will be pushed onto the runtime stack. Next, the new value of data member "y" will be pushed onto the stack. Next, the mutator method for the UDT is invoked on the instance of the variable @p. This results in the value of data member "y" being changed to "4.0." The changed instance is then serialized to disk, and a value is returned indicating the completion of the operation.

Binary Ordering in UDTs

According to yet another feature of the invention, the class defining a user-defined type may further contain an attribute that specifies that serialized binary representations of instances of the user-defined type will be binary ordered. This allows binary comparisons to be made on instances of the type and also enables indexing to be performed on instances of the type. In the present embodiment, a UDT class author can specify that serialized binary representations of instances of a UDT are binary ordered using the IsByteOrdered property of the SqlUserDefinedType( ) custom attribute, as described above.

According to this aspect of the present invention, for instances of a user-defined type that are binary ordered, when a query language expression that requires some comparison of two instances of the type is received by the database system (e.g., <>,==, >, <, <=, or >=), the serialized binary representations of the two instances are used to evaluate the expression, without deserializing either instance.

Additionally, for a user-defined type that is binary ordered, a table in the database store can be created that has a column defined as the user-defined type. An index can then be created on the column. For example, assume that the following table is defined:

```
CREATE TABLE Cities
{
    Name varchar (20);
    State varchar (30);
```

-continued

```
    p Point
}
```

An index can then be created on the column "p" defined as UDT Point with the following statement:

CREATE INDEX idx on Cities(p)

Additionally, an index can also be created over a query language expression that references the user-defined type. In this case, a computed column is first generated over the expression, and then an index is created over the computed column. For example, in the following table definition:

```
CREATE TABLE T
{
    p Point
    p1 as p.x Persisted
}
``` a computed column, p1, is generated in the second line. An index can then be created on the computed column with the statement:

CREATE INDEX idx on T(p1).

Then, when queries such as:

SELECT * from T
WHERE p.x=5 are evaluated, the query engine can do a look-up on the index as opposed to generating IL that would have to invoke methods on the instances of the column values.

Using UDTs Across Databases

In the present embodiment, UDTs are scoped to a single database. As such, there normally can be no cross-database UDT references in the metadata of the database. As a result, UDTs defined in one database cannot be used in a column definition in another database. However, in accordance with another aspect of the present invention, if the same UDT is registered and accessible in two databases, it will be possible to convert a UDT value from one database for use in another database. The goal of this feature is to promote interoperability between the identical UDT registered in different databases in the following scenarios:

(i) calling a stored procedure defined in a different database;

(ii) querying over tables defined in two different databases; and (iii) selecting data from one database and inserting it into another.

The system will allow conversion of UDTs defined in different databases only if the types are equivalent in the two databases. Two types are equivalent if their assemblies are deemed equivalent. Assemblies are equivalent if their external signatures are equivalent (i.e., name, version, and public key token), and if their binary implementation details are identical. In the present embodiment, the database system verifies that the assemblies are identical down to their build numbers, by consulting a module version identifier ("mvid"). The mvid is part of the assembly metadata that is generated by managed compilers and is changed on every recompile of the assembly. In other embodiments, equivalency may be based on other rules, such as a requirement for full structural equivalency, a requirement for equivalency based on a COM-style GUID associated with the user-defined type, or other requirements.

By way of example, suppose UDT u1 is registered in database db1, and is also in database db2. Suppose further that proc p2 is defined in database db2, and takes u1 (u1 defined in db2 actually) as a parameter. In accordance with this aspect of the invention, it is possible to call proc p2 with an instance of u1 registered in db1, as follows:

use db1
declare @u u1
exec db2.dbo.p2 @u

In the present embodiment, the assembly containing the UDT should be registered with the same set of code access permissions in both databases. Additionally, the UDT author should have select and execute permissions on each UDT column that is referenced in a query. These permissions should be checked with respect to the database in which the column is defined. Also, if a UDT is implemented in assembly A1, and a method of the UDT calls a method in assembly A2, the cross-assembly call should be checked in exactly the same way as if the UDT query was issued without cross-database references, i.e. the permissions on the assembly registered in the database in which the column or variable definition is declared should be checked.

Metadata

As mentioned above, in the present embodiment, as part of the type creation and validation process, the facets (data members and methods) of the UDT are validated and information, in the form of metadata, is imported into the database system catalog that describes the structure of the type and its methods. FIG. 6 illustrates the column headings of a table of the database system catalog in which metadata information for each system type and each user-defined type that has been created and validated by the database system is stored, in accordance with the present embodiment. For each column of this system table, FIG. 6 shows the name of the column, an indication of the data type of the column, and a description of the item of information stored in that column. There will be a row in this system table for each system and user-defined type. The "is$_{13}$ user_defined" field of a given row is set to "1" if the type is a user-defined type. FIG. 7 illustrates the column headings of another table of the database system catalog in which additional metadata information for each user-defined type contained in a CLR assembly is stored. Each row of this table stores metadata about one user-defined type. The information stored for each type includes, an identification (assembly_id) of the assembly from which the type was created. The "is_binary_ordered" and "is_fixed_length" fields contain the information provided by the UDT class author in the "IsByteOrdered" and "IsFixedLength" properties of the SqlUserDefinedType( ) custom attribute of the class definition for the type.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for creating user-defined types in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the methods of the present invention.

Figure 8:
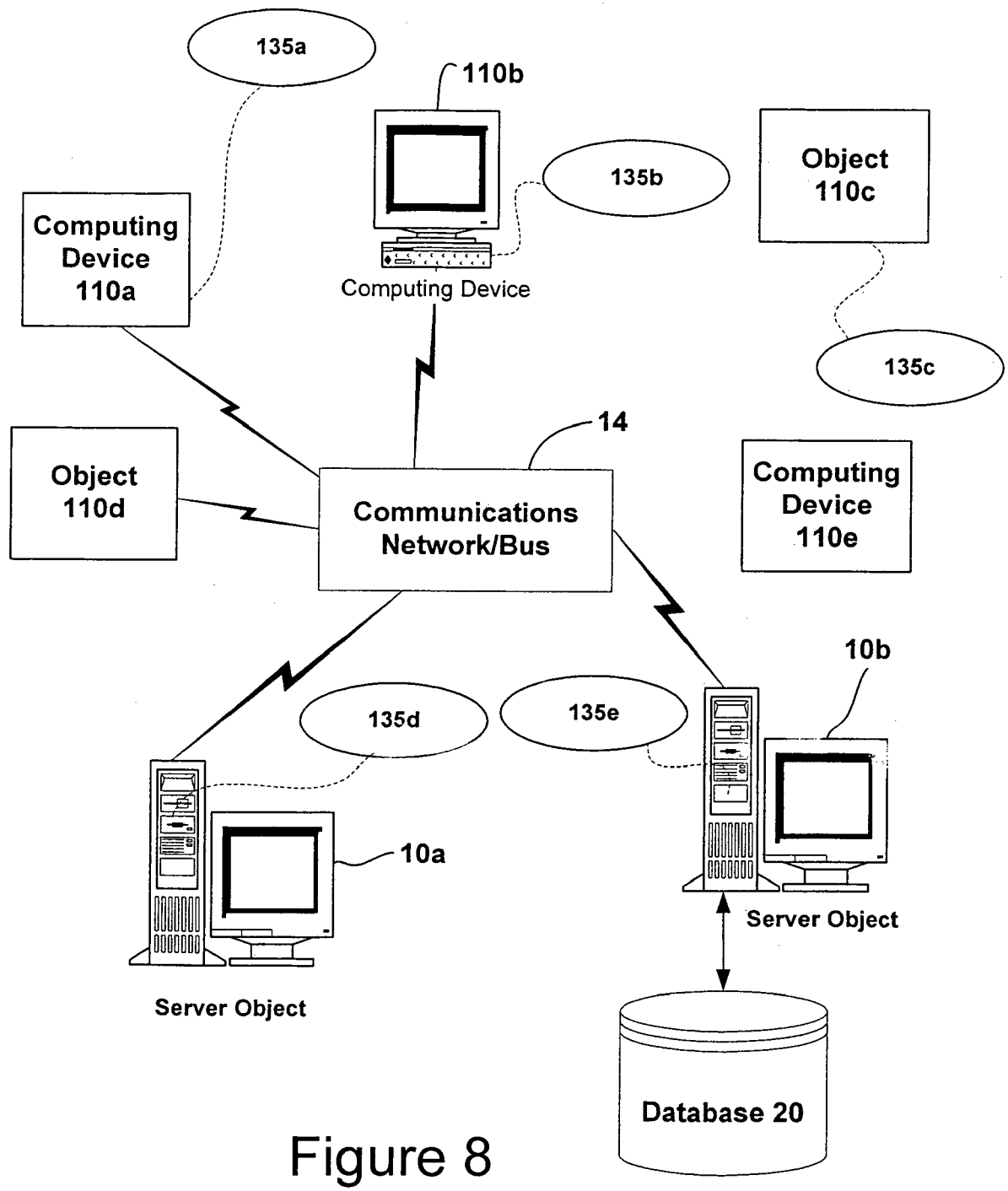
FIG. 8 is a block diagram representing an exemplary network environment having a variety of computing devices in which the present invention may be implemented.

FIG. 8 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 8, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 8, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the user-defined type techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 8 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to create user-defined types in a database store.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Figure 9:
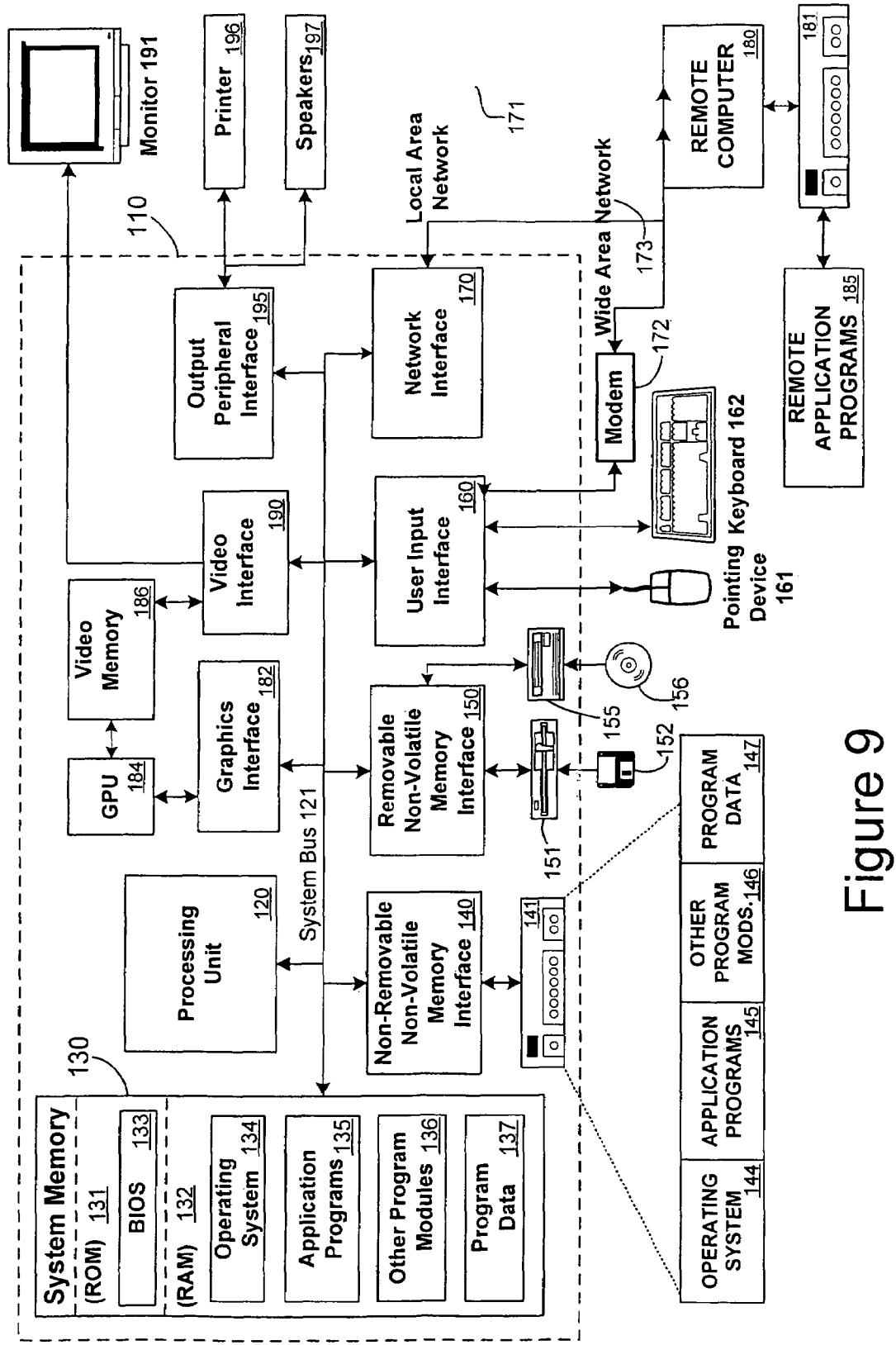
FIG. 9 is a block diagram representing an exemplary computing device in which the present invention may be implemented.

FIG. 9 and the following discussion are intended to provide a brief general description of a suitable computing device in connection with which the invention may be implemented. For example, any of the client and server computers or devices illustrated in FIG. 8 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 9 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 9, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9 illustrates operating system 134, application programs 135, other program modules 136, and program data 137.

The computer 110 may also include other removable/non-removable, volatile/nonvolatile computer storage media. By way of example only, FIG. 9 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 9 provide storage of computer readable instructions, data structures, program modules and other data for the computer 110. In FIG. 9, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9. The logical connections depicted in FIG. 9 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 9 illustrates remote application programs 185 as residing on memory device 181. It will be appreciated that the network connections shown are exemplary and other means of establishing a communications link between the computers may be used.

As the foregoing illustrates, the present invention is directed to a system and methods for creating user defined types in a database management system. It is understood that changes may be made to the embodiments described above without departing from the broad inventive concepts thereof. For example, while an embodiment of the present invention has been described above as being implemented in Microsoft's SQL SERVER database management system, it is understood that the present invention may be embodied in any database management system. Accordingly, it is understood that the present invention is not limited to the particular embodiments disclosed, but is intended to cover all modifications that are within the spirit and scope of the invention as defined by the appended claims.

"Microsoft" and "Windows" are registered trademarks of Microsoft Corporation, and ".NET," "Visual Basic," and "SQL Server" are trademarks of Microsoft Corporation.

What is claimed:

1. A computer-implemented method for creating a user-defined type in a database system, comprising:
   receiving code that executes on a processing unit and that implements a class defining the structure of a user-defined type and methods that can be invoked on instances of the user-defined type;
   enforcing a contract against the class to ensure that the user-defined type will act like any scalar type of the database system, the contract comprising:
   a first requirement that the class specify one of a plurality of different formats for persisting instances of the user-defined type in a database store, the plurality of different formats comprising at least a first format in which an instance of the user-defined type is automatically serialized in accordance with a native format of the database system and a second format in which an instance of the user-defined type is serialized in a manner defined by the class;
   a second requirement that the class be capable of returning a null value for the user-defined type; and
   a third requirement that the class provide a method for converting the user-defined type to another type;
   storing metadata about the user-defined type for subsequent use by the database system in creating instances of the user-defined type; and
   creating instances of the user-defined type only when the class meets the requirements of the contract.

2. The method of claim 1, wherein the plurality of different formats for persisting instances of the user-defined type further comprises a third format in which an instance of the user-defined type is serialized in accordance with a method provided by the MICROSOFT .NET FRAMEWORK.

3. The method of claim 1, further comprising instantiating the user-defined type as one of a column value in a table, a variable, a parameter of a routine, and a return value of a routine.

4. The method of claim 1, further comprising:
   receiving an expression in the query language of the database system, wherein evaluation of the expression requires invocation of a method of an instance of the user-defined type;
   translating the expression into a sequence of program code instructions that invoke the required method on the instance of the user-defined type;
   invoking the method upon execution of the program code; and
   returning a result of the method invocation as the evaluation of the query language expression.

5. The method of claim 1, wherein the class that defines the user-defined type comprises a mutator method that, when invoked, enables a value of the user-defined type to be changed, and wherein the method further comprises invoking the mutator method on an instance of the user-defined type to change the value of the instance.

6. The method of claim 1, wherein the class defining the structure and method of the user-defined type further comprises an attribute that specifies that serialized binary representations of instances of the user-defined type will be binary ordered.

7. The method of claim 6, further comprising:
   serializing instances of the user defined type such that the binary representations of the instances are binary ordered;
   receiving an expression in a query language of the database system that requires the comparison of a first instance of the user defined type to a second instance of the user defined type; and
   comparing the serialized binary representations of the first and second instances of the user-defined type to evaluate the expression, without deserializing either instance.

8. The method of claim 6, further comprising:
creating a table in a database store in which a type of a column of the table is defined as the user-defined type; and
creating an index on the column.

9. The method of claim 6, further comprising:
serializing instances of the user defined type such that the binary representations of the instances are binary ordered;
receiving an expression in a query language of the database system, the evaluation of which requires invocation of a method on an instance of the user defined type;
generating a computed column over the expression; and
creating an index over the computed column.

10. A computer-readable storage medium having program code stored thereon, the program code, when executed by a computer, causing the computer to perform the steps of the method recited in claim 1.

11. A computer system that implements a database system, the computer system comprising:
a processing unit;
a memory;
a runtime that executes on the processing unit and that provides code execution within the database system; and
a database server executing on the processing unit, the database server enabling instances of user-defined types to be persisted in a database store in a plurality of different formats including at least a first format in which instances of user-defined types are automatically serialized in accordance with a native format of the database server and a second format in which instances of user-defined types are serialized in a manner defined by the user-defined types themselves,
the database server receiving code that implements a class defining the structure of a user-defined type and methods that can be invoked on instances of the user-defined type and that enforces a contract against the class to ensure that the user-defined type will act like any scalar type of the database system, the contract comprising:
a first requirement that the class specify one of said plurality of different formats for persisting instances of the user-defined type in the database store;
a second requirement that the class be capable of returning a null value for the user-defined type; and
a third requirement that the class provide a method for converting the user-defined type to another type,
the database server storing metadata about the user-defined type for subsequent use by the database server in creating instances of the user-defined type; and
the database server creating instances of the user-defined type only when the class meets the requirements of the contract.

12. The computer system of claim 11, wherein the database server also enables instances of user-defined types to be stored in a third format in which instances of the user-defined types are serialized in accordance with a method provided by the MICROSOFT .NET FRAMEWORK, and wherein said first requirement of the contract requires that the class specify one of at least said first format, said second format or said third format for persisting instances of the user-defined type in the database store.

13. The computer system of claim 11, wherein a user of the database system can instantiate the user-defined type as one of a column value in a table, a variable, a parameter of a routine, and a return value of a routine.

14. The computer system of claim 11, further comprising a query processor that (i) receives an expression in the query language of the database system, wherein evaluation of the expression requires invocation of a method of an instance of the user-defined type, (ii) translates the expression into a sequence of program code instructions that invoke the required method on the instance of the user-defined type, (iii) invokes the method upon execution of the program code, and (iv) returns a result of the method invocation as the evaluation of the query language expression.

15. The computer system of claim 11, wherein the class that defines the user-defined type comprises a mutator method that, when invoked, enables a value of the user-defined type to be changed, and wherein the database server invokes the mutator method on an instance of the user-defined type to change the value of the instance.

16. The computer system of claim 11, wherein the class defining the structure and methods of the user-defined type further comprises an attribute that specifies that serialized binary representations of instances of the user-defined type will be binary ordered.

17. The computer system of claim 16, wherein the database server serializes instances of the user defined type such that binary representations of the instances are binary ordered, and wherein when the database server receives an expression in a query language of the database system that requires the comparison of a first instance of the user defined type to a second instance of the user defined type, the database server compares the serialized binary representations of the first and second instances of the user-defined type to evaluate the expression, without deserializing either instance.

18. The computer system recited in claim 16, wherein the database server creates a table in a database store in which a type of a column of the table is defined as the user-defined type, and wherein the database server creates an index on the column.

19. The computer system of claim 16, wherein the database server serializes instances of the user defined type such that the binary representations of the instances are binary ordered, and wherein when the database server receives an expression in a query language of the database system, the evaluation of which requires invocation of a method on an instance of the user defined type, the database server generates a computed column over the expression and then creates an index over the computed column.

* * * * *